2,815,354

ACYLATED POLYESTERS OF DIHYDROXY-ALKANES WITH DICARBOXYLIC ACIDS

Joseph M. Wilkinson and Richard E. Field, Easton, Pa., assignors to General Aniline & Film Corporation, New York, N. Y., a corporation of Delaware No Drawing. Application August 6, 1954, Serial No. 448,373

7 Claims. (Cl. 260—404.8)

This invention relates to acylated polyesters of dihydroxyalkanes with dicarboxylic acids of 5 to 10 carbon atoms, of particular interest as plasticizers of synthetic resins.

In the preparation of vinyl resins (viz. polyvinyl chloride, vinyl chloride-vinyl acetate, interpolymers, etc.), cellulose esters and ethers for various uses, it is common practice in the art to modify them by the addition of materials having a plasticizing or softening action. It is a necessary requisite of these plasticizers that they be compatible over a fairly wide range, have good stability, low volatility, good resistance to oxidation or migration on aging, be resistant to the leaching action of water and oil, and must not develop objectionable odors on standing.

If a plasticizer is not completely compatible in the proportions generally used with a vinyl resin cellulose ester or ether, it will immediately or in time exude from a cast or milled film or molded article to give an opaque appearance and oily feel, noticeable particularly after the molded article or film is allowed to stand. In either case, the resin tends to revert to its original hardness and brittleness. Since low boiling plasticizers evaporate slowly on standing or at temperatures to which the resinous material is subjected either in preparation or use, the film or molded article again becomes brittle, and may easily crack or break. Films and molded articles are frequently subjected to water. If the plasticizer is water soluble to even a small extent, the plasticizer is gradually leached out of the plasticized resin which then becomes hard and brittle. Other properties which may be desired of a plasticizer will depend on the end use of the resin to be plasticized. Some plasticizers will impart resistance to flammability, low temperatures, solvent action of oils and greases, and weathering. For example, triphenyl phosphate is commonly used where low flammability is desired. On aging, some plasticizers discolor badly or oxidize to give off objectionable odors. No previous plasticizer seems to be completely satisfactory. Prior plasticizers generally fail in one or more of the previously mentioned necessary properties of compatibility, low volatility, and water and/or oil resistance.

The following esters are representative of those which have reached commercial acceptance:

Triacetin (glyceryl triacetate)
Dibutyltartrate
Methoxyethyl adipate
Methoxyethyl oleate
Triphenyl phosphate
Tricesyl phosphate
Methylphthalyl ethylglycolate
Dimethylphthalate
Dioctylphthalate
Dimethoxyethylphthalate
Dibutoxyethylphthalate
Butyl "Cellosolve" stearate
Ethylene sebacate
Dioctyl sebacate
Trimethylene adipate
Hexamethylene succinate
Hexamethylene sebacate
Decamethylene sebacate
Tetramethylene cyclohexylbutyrate The foregoing plasticizers have not been accepted with complete satisfaction, however, because of their various defects, the principal one being that many of these esters are somewhat volatile. Evaporation from a resinous composition results in embrittlement on aging and poor flexibility at low temperatures which limits their usefulness. Moreover, the plasticizers possess the objectionable property of yellowing the vinyl resin, cellulose ester or ether composition, when such a plasticized composition is exposed to elevated temperatures of manufacture, the property of developing objectionable odors through oxidation of the plasticizer on aging, and the property of being readily leached from such resinous compositions on contact with water. For example, in cellulose acetate, the volatility or percent weight loss of film after 24 hours at 100° C., ranges from 5.5 to 9.4 percent, and the water extractability or percent weight loss of film after 48 hours in water at room temperature, ranges from 3 to 15.8 percent. The percent weight loss is tolerable when it does not exceed 4 percent and 6 percent, respectively. Above these losses, the plasticized cellulosic products develop brittleness.

Polyesters of high molecular weight prepared by the reaction of a glycol with a dicarboxylic acid or by the intramolecular reaction of a hydroxy carboxylic acid have been suggested as possible plasticizers. Since their molecular weight are generally high, e. g. about 7,000 to 10,000, many of the polyesters are solids, which require heating to a fairly high temperature to melt them. Since convenience dictates use of liquids, their use as plasticizers has largely been restricted.

Practically all of the high molecular weight polyesters prepared by prior art procedures are either very viscous oils or waxy semi-solid to solid materials at room temperature. The use of such viscous oils and solids is highly undesirable in the plasticizing art, particularly in the United States, due to the difficulties in handling and incorporating into plastic materials. Polyesters containing branch chain glycols are particularly subject to thermal degradation when the hydroxyl groups are attached to other than adjacent carbon atoms. Moreover, when these polyesters are exposed to the atmosphere at temperatures above their melting points, they decrease continuously in average molecular weight indicating that molecular degradation has occurred. Such degradation results in very low molecular weight products which evaporate when incorporated into plastic compositions. In addition, the degraded polyesters are unstable to heat and to the leaching action of water. Moreover, these high molecular weight polyesters are frequently incompatible, particularly with vinyl resins, and, consequently, are observed to exude from the plasticized resinous composition in which they have been incorporated.

We have found that the foregoing objections can be overcome by plasticizing vinyl resins, cellulose ester and ether compositions with liquid acylated polyesters (of a glycol and a dibasic acid) having an average molecular weight of 600 to 3,000 and characterized by the following formula:

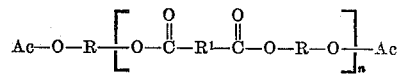

wherein Ac represents a monobasic acyl radical containing from 2 to 18 carbon atoms, e. g., acetyl, propionyl, butyryl, lauroyl, caproyl, myristoyl, oleoyl, stearoyl, benzoyl, etc. and wherein at least one of the acyl radicals contains from 10 to 18 carbon atoms. R represents a mixture of alkylene radicals, one of said radicals being 1,2-propylene and the other selected from the group consisting of 1,4-butylene and 1,6-hexalene, said 1,2-propylene being present in the mixture in the amount of 40 to 60 mole percent. $R^1$ represents a radical selected from the group consisting of an $\alpha,\omega$-radical of from 3 to 8 carbon atoms, e. g., 1,3-propylene, 1,4-butylene, 1,5-pentylene, 1,6-hexylene, 1,7-heptylene, 1,8-octylene and 1,2-arylene radical of the benzene series, e. g., 1,2-phenylene and tetrahydro-1,2-phenylene, said 1,2-arylene radical being present in amount not exceeding 50 mole percent of the total $R^1$ radicals, the ratio of R to $R^1$ radicals being 1.1:1 to 1.5:1 and $n$ represents an integer from 2 to 10.

The polyesters characterized by the foregoing formula when employed as plasticizers display outstanding properties in that they impart to the vinyl resin and cellulose ether or ester composition greater elasticity and higher tensile strength. They are compatible with all of the commonly employed vinyl resins, cellulose esters and ethers so that no air or water exudation of the plasticizer occurs. They are odorless, are unaffected by ultraviolet radiation, and do not impart any appreciable color to the plasticized resinous composition. Moreover, they are stable to heat so that their volatility in the resinous composition is negligible.

In addition, the polyesters of the present invention possess the essential prerequisites of commercially acceptable plasticizers to a very marked extent, not only in compatability with vinyl resins and cellulosic plastics, but also retentivity by the plastic material in which they are incorporated, not readily being leached out by water or extracted by organic solvents.

The polyester plasticizers characterized by the above formula are prepared by first esterifying one mole of an aliphatic dicarboxylic acid of 5 to 10 carbon atoms or mixtures thereof containing a 1,2-arylene dicarboxylic acid or anhydride with an amount in excess of one mole of a mixture of 1,2-propylene glycol and 1,4-butanediol or 1,6-hexanediol. The excess of the mixture of glycols may range from 10 percent to 200 percent, preferably in the range of 20% to 58% of the requisite equimolecular amount. The resulting polyester mixture, which mainly contains a polyester having a hydroxyl group at each end, is then treated with 1 or 2 moles of a monocarboxylic acid of 2 to 18 carbon atoms or mixtures thereof to yield the final product containing an acyl group at both ends of the polyester molecule.

The glycols, such as 1,2-propylene glycol, 1,4-butanediol, and 1,6-hexanediol, are commercially available products. 1,4-butanediol is prepared by catalytic hydrogenation of 2-butyn-1,4-diol which is obtained from the reaction of acetylene with formaldehyde. 1,6-hexanediol is obtained from the oxidative dimerization of propargyl alcohol, yielding 2,4-hexadien-1,6-diol followed by catalytic hydrogenation, or by the catalytic hydrogenation of adipic acid or its esters.

It is of the utmost importance that the mixture of either 1,2-propylene glycol and 1,4-butanediol or the mixture of 1,2-propylene glycol and 1,6-hexanediol must contain 1,2-propylene glycol

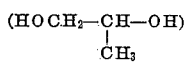

in the amount of 40 to 60 mole percent. A deviation from this amount yields either a very viscous or a semisolid polyester, which as noted above is highly undesirable in the plasticizing art. Polyesters prepared from 1,2-propylene glycol alone do not confer low temperature flexibility as good as those prepared in accordance with the present invention. Equally important and essential to the production of the liquid plasticizers of the present invention and having the foregoing desirable characteristics, i. e., particularly low temperature plasticity, is the utilization of either 1,4-butanediol or 1,6-hexanediol in 60 to 40 mole percent of the mixture.

The following are illustrative examples of dicarboxylic acids or anhydrides which may be employed as such or in admixture in esterifying the glycol mixture:

| | |
|---|---|
| Glutaric | Tetrahydro-o-phthalic acid |
| $\alpha,\alpha$-Oxydiacetic acid | Hexahydro-o-phthalic acid |
| Adipic | Suberic |
| Pimelic | Azelaic |
| Phthalic | Sebacic |
| Phthalic anhydride | |

As illustrative examples of monocarboxylic acids or anhydride of 2 to 18 carbon atoms, which may be either saturated or unsaturated, the following may be mentioned:

| | |
|---|---|
| Acetic | Angelic |
| Acetic anhydride | Capric |
| Acrylic | Hendecanoic |
| Vinyl acetic | Oleic |
| Propionic | Ricinoleic |
| Cyclopropane carboxylic acid | Lauric |
| Butyric | Erucic |
| Allylacetic | Myristic |
| Valeric | Palmitic |
| Tiglic | Margaric |
| Caproic | Stearolic |
| Enanthic | Stearic |
| Caprylic | Benzoic |
| Pelargonic | Toluic |

In polyesters wherein 1,4-butanediol or 1,6-hexanediol is not employed as a glycol component, the phthalic acid content must be considerably lower than 50 mole percent to impart low temperature flexibility. In view of the mixture of glycols employed (1,2-propylene glycol and 1,4-butanediol or 1,6-hexanediol), it is possible to employ up to 50 mole percent of a 1,2-arylene acid of the benzene series, such as, for example, phthalic acid or the anhydride thereof to obtain a polyester having exceedingly low extractability in water and organic solvents with accompanying low temperature flexibility when incorporated into vinyl resins and cellulosic plastic materials.

The polyesters of the present invention are acylated so that at least one terminal hydroxy group is esterified with a monocarboxylic acid of 10 to 18 carbon atoms while the remaining terminal hydroxy is esterified with a monocarboxylic acid of 2 to 18 carbon atoms. This particular molecular arrangement yields a polyester possessing improved properties with respect to heat stability, decreased water extractability, and to some extent the low temperature flexibility without adversely affecting the other desirable characteristics.

The method of preparation reaction consists of the following steps: (1) The initial esterification at atmospheric pressure, which may include acylation with a monocarboxylic acid, (2) heating in vacuo, and (3) chain ending or acylation of the end hydroxyl groups if not already included in step 1. To insure complete esterification, the initial esterification reaction is carried out with a 20 to 50 mole percent excess of glycols consisting of a mixture of 1,2-propylene glycol with either 1,4-butanediol or 1,6-hexanediol, in which 40 to 60 mole percent of the total glycol content is composed of 1,4-butanediol and/or 1,6-hexanediol. The dicarboxylic acid component in the esterification may be a single dicarboxylic acid or a mixture of two different dicarboxylic acids. Furthermore, a monocarboxylic acid or a mixture of monocarboxylic acids may be incorporated in the initial esterification mixture, along with the dicarboxylic acid or mixtures thereof; or a monocarboxylic acid may be added at an intermediate state in the initial esterification prior to heating in vacuo; or, finally, the monocarboxylic acid may be added after the initial esterification and after heating in vacuo. A final heating under vacuum is preferable from the practical standpoint.

The initial polyesterification is conducted at a temperature ranging from 100 to 250° C., preferably at about 130–220° C., for at least 2 hours in an inert atmosphere, such as dry oxygen-free nitrogen and any suitable means for the removal of water as it is formed.

The esterification reactions may be carried out in the presence of a catalyst, such as p-toluenesulfonic acid. However, it has been observed that esterification proceeds equally well in the absence of catalyst. The use of Nuchar, a commercially available decolorizing charcoal, may be employed during the esterification or during the heating in vacuo to improve materially the color of the polyester.

The vacuum treatment is carried out in a nitrogen atmosphere at such temperatures that all volatile materials, including the excess of glycols, are removed by distillation, preferably at a temperature ranging from 150 to 300° C., and at a pressure of 10 mm. of mercury or less for periods of 1 to 4 hours. The residue is the desired product and is a pale yellow liquid. If not previously terminally acylated, the liquid is charged into a reaction vessel equipped with stirrer, thermometer, take-off condenser and inlet for dry oxygen-free nitrogen. To the charge is added either a sufficient amount of a monocarboxylic acid of 2 to 18 carbon atoms or a sufficient mixture of different acids to react with the residual free end hydroxyl groups. The charge is stirred at room temperature and then heated at a temperature ranging from 100 to 300° C. to complete the acylation and, subsequently, to remove the excess acid or mixture of acids by distillation. The product is then heated in vacuum under nitrogen at 200–250° C. and at a pressure below 10 mm. of mercury.

The following examples will serve to illustrate the process utilized in the preparation of the liquid acylated polyesters. All parts are given by weight unless otherwise specified.

EXAMPLE I 110 parts (0.75 mole) of adipic acid, 47 parts of a commercially mixed fatty acid sold under the brandname of "Neo-Fat 9" containing 90 percent of capric acid, 7 percent of lauric acid, and 3 percent of caprylic acid, and 45 parts (0.5 mole) of 1,4-butanediol and 38 parts (0.5 mole) of 1,2-propylene glycol were charged into a 500 ml., 3 necked-flask equipped with stirrer, thermometer, take-off condenser and inlet for dry, oxygen-free nitrogen. The mixture was heated at 150–200° C. for 1½ hours and at 200–220° C. for an additional 5½ hours while removing the water by distillation as it was formed. The product was transferred to a 500 ml. still pot, equipped with a capillary inlet for dry, oxygen-free nitrogen, and heated in vacuo at 200–225° C. and 0.3 to 0.5 mm. of mercury for 1 hour to remove the excess 1,2-propylene glycol and 1,4-butanediol. After cooling, the residue was charged into a 300 ml., 3-necked flask, equipped as above, and 26 parts (0.25 mole) of acetic anhydride added. The mixture was stirred for ½ hour at room temperature and then heated at 105–217° C. during 1 hour, removing the acetic acid and excess acetic anhydride by distillation. The product was then heated in vacuo under dry, oxygen-free nitrogen for 1 hour at 214–240° C. and at 0.9 to 1.2 mm. of mercury. The product obtained is a yellow-orange liquid. The molecular weight of the final product ranges from 600 to 800 as determined cryoscopically in acetone.

EXAMPLE II 117 parts (0.8 mole) of adipic acid 30 parts (0.2 mole) of phthalic anhydride, 116 grams (0.67 mole) of a commercially mixed fatty acid sold under the brandname of "Neo-Fat 9" containing 90 percent of capric acid, 7 percent of lauric acid, and 3 percent of caprylic acid, and 120 parts (0.67 mole) of 1,4-butanediol, and 103 parts (0.67 mole) of 1,2-propylene glycol were charged into a 1-liter 3-necked flask, equipped as in Example I. The mixture was heated under nitrogen at 150 to 200° C. for 3½ hours, and at 200 to 220° C. for an additional 5 hours, while removing the water by distillation as it was formed. The product was transferred to a 1-liter still pot, equipped with a capillary inlet for dry nitrogen, and heated in vacuo at 200–225° C. and 0.7 to 0.8 mm. of mercury for 1 hour. The residue was cooled and treated with acetic anhydride as in Example I and then heated in vacuo at 200–245° C. and 0.3 to 0.6 mm. of mercury for 1 hour. The product obtained was a liquid having a molecular weight of 800 to 1,000.

EXAMPLE III

The same coreactants as in Example II were charged and the esterification conducted in the same manner. After heating in vacuo for 1 hour as in Example II, the reaction mixture was treated with 48 parts (0.33 mole) of 2-ethylhexoic acid to react with hydroxyl chain ends, while heating at 115–215° C. for 45 minutes. 10 parts of Nuchar decolorizing charcoal added and heated in vacuo at 210–250° C. and 1 mm. of mercury for 1 hour. Filtration under suction to remove Nuchar gave a product of a light yellow, viscous liquid having a molecular weight of 800 to 1,000.

EXAMPLE IV 730 parts (5 moles) of adipic acid, 253 parts (3.33 moles) of 1,2-propylene glycol and 300 parts (3.33 moles) of 1,4-butanediol were charged into a 2-liter 4-necked flask equipped with thermometer, nitrogen inlet, sealed stirrer, and short Vigreux distilling head connected to the condenser. After purging with nitrogen, the reaction mixture was heated at 115–212° C. for approximately 9½ hours and the water removed by distillation as it was formed. The acylation was accomplished by adding 250 parts (1.25 moles) of a commercially mixed fatty acid sold under the brandname of "Neo-Fat 9" containing 90% of capric acid, 7% of lauric acid, and 3% of caprylic acid and heating at a temperature ranging between 163 and 216° C. for 4¼ hours. To the resulting reaction mixture were added 20 parts of Nuchar decolorizing charcoal and then heated at 110–250° C. and 5–7 mm. of mercury for approximately one hour, and filtered to remove the Nuchar. The resulting filtrate was a pale yellow liquid.

EXAMPLE V

A stock polyester solution was prepared for use in a series of reactions to study the effect of the fatty acid third component on the properties of the finished plasticizer. A stock polyester was prepared as follows.

2,628 parts (18 moles) of adipic acid, 1080 parts (12 moles) of 1,4-butanediol, and 914 parts (12 moles) of 1,2-propylene glycol were charged into a 5-liter 4-necked flask equipped with Vigreux head, and the esterification carried out as in Example IV. The resulting polyester contained 2 moles of adipic acid, 1.33 moles of 1,4-butanediol and 1.33 moles of 1,2 propylene glycol per portion used in acylation step.

The foregoing polyester stock solution was divided into 9 parts, six of which were acylated with various monocarboxylic acids and mixtures thereof by following the procedure of Example VI. The results obtained from this study are shown in Table I.

Table I

| Exp. No. | Stock polyester acylated with— | Heat stability 90 min. | Heat stability 150 min. | Low temperature crack point, °C. | Extraction at 96 hrs. Water, percent | Extraction at 96 hrs. Oil, percent | Acid No. | Hydroxyl No. |
|---|---|---|---|---|---|---|---|---|
| 1 | 0.5 mole of DD*-coconut fatty acids | Good | Fair | −20 | 1.1 | 1.6 | 3.1 | 38 |
| 2 | Mixture of 0.4 mole of DD-coconut fatty acids and 0.1 mole benzoic acid. | do | do | −20 | 0.6 | 1.1 | 2.8 | 33 |
| 3 | Mixture of 0.4 mole of "Neo-Fat 11" and 0.1 mole of benzoic acid. | do | do | −20 | 0.9 | 1.4 | 3.27 | 38 |
| 4 | 0.5 mole of 2-ethylhexoic acid | do | do | −20 | 1.1 | 0.7 | 2.02 | 44 |
| 5 | Mixture of 0.4 mole of DD-coconut fatty acids and 0.1 mole oleic acid. | do | do | −20 | 1.1 | 2.0 | 4.43 | 41 |
| 6 | Mixture of 0.4 mole of DD-coconut fatty acids and 0.1 mole of 2-ethylhexoic acid. | do | do | −20 | 1.1 | 1.5 | 2.72 | 43 |

*DD=double distilled.

EXAMPLE VI 175 parts (1.2 moles) of adipic acid, 88 parts (0.75 mole) of 1,6-hexanediol, and 57 parts (0.75 mole) of 1,2-propylene glycol were charged into a 1-liter, 3-necked flask, equipped as in Example I. After purging with nitrogen, the reaction mixture was heated at 150–220° C. for 6 hours, and the water removed by distillation as it was formed. The mixture was heated in vacuo under nitrogen atmosphere at 150–250° C. at 1 mm. pot temperature for 1 hour. The acylation was accomplished by adding 24 parts (0.167 mole) of 2-ethylhexoic acid and heating at 100–250° C. for 4 hours. To the resulting reaction were added 10 parts of Nuchar decolorizing charcoal and then heated at 200 to 250° C. and 1–2 mm. of mercury for 1 hour, and filtered to remove the Nuchar. The resulting product was a pale yellow liquid.

EXAMPLE VII 148 parts (1.0 mole) of phthalic anhydride, 146 parts (1.0 mole) of adipic acid, 240 parts (1.33 mole) of 1,4-butanediol, and 204 parts (1.33 mole) of 1,2-propylene glycol were charged into a 2-liter, 3-necked flask, equipped as in Example I. The mixture was heated in a nitrogen atmosphere at 150–200° C. for 5 hours, removing the water by distillation as it was formed. At this point, 106 parts (0.53 mole) of "Neo-Fat 11" (90 percent lauric acid) and 38 parts (0.14 mole) of oleic acid were added and esterification continued for an additional 4 hours at 150–220° C. The reaction mixture was then heated in the presence of Nuchar (activated charcoal) in vacuo at 200–240° C. and 2 mm. of mercury for 1 hour. After filtering to remove the Nuchar, the product obtained was a light yellow liquid.

EXAMPLE VIII 584 parts (4.0 moles) of adipic acid, 240 parts (2.67 moles) 1,4-butanediol and 204 parts (2.67 moles) 1,2-propylene glycol were charged into a 2-liter 4-necked flask equipped as in Example IV. The reaction mixture was heated at 150–210° C. for approximately 6 hours, removing the water by distillation as it was formed. The acylation was accomplished by adding 200 parts (1.0 mole) of a commercially available fatty acid mixture sold under the brandname "Neo-Fat 11" containing 90% lauric acid, a trace of capric acid, 9% myristic acid and 1% unsaturates. Heating was continued at 150–210° C. for approximately 4½ hours. To the resulting reaction mixture were added 20 parts of Nuchar decolorizing charcoal and then heated at 175 to 250° C. and 5 mm. of mercury for approximately 1 hour, and filtered to remove the Nuchar. The resulting filtrate was a pale yellow, mobile liquid.

The polyesters prepared as above are compatible with all of the cellulose esters and ethers commercially used, such as, for example, cellulose acetate, cellulose triacetate, cellulose acetate-propionate, celluose acetate-butyrate, celulose acetate nitrate, cellulose nitrate-acetate, ethyl cellulose, benzyl cellulose, polyvinyl chloride, vinyl chloride-vinyl acetate interpolymers, vinyl chloride-vinylidene chloride interpolymer, and the like.

The polyesters may be incorporated into molding powders or into solutions which are normally prepared for films, lacquers, dopes, and laminating solutions. The concentration or amount to be used as a plasticizer will depend, of course, on the type of cellulose ester or ether composition. The approximate amounts to be employed for any particular composition can be very readily determined by simple routine spot experiments. In general, however, the amount for molding powders may range from 20 to 40 percent of the powder, in solutions for films from 3 to 6 percent, in lacquers about 2 to 5 percent, in dopes from 40 to 60 percent, and in laminating solutions from 3 to 6 percent. All of these percentages are based on the weight of the cellulose ester or ether.

The following examples illustrate the application of the foregoing esters as plasticizers and the improved results obtained thereby when compared with currently used plasticizers.

EXAMPLE IX

A film of cellulose acetate of 5 mil thickness, containing 58.4 to 59 percent combined acetic acid, was prepared by casting the composition given below on a clean, glass plate with a doctor blade, followed by air drying for 48 hours at room temperature at a controlled rate to prevent blushing of or other physical damage to the film. The film was then removed from the glass plate and further dried for 2 hours at 60° C. in the presence of freely circulating air.

|  | Parts |
|---|---|
| Cellulose acetate | 15 |
| Dimethyl phthalate | 3 |
| Methylene chloride | 50 |
| Ethylene chloride | 22 |
| Absolute ethanol | 10 |

In like manner, films of the same thickness were prepared in which the plasticizers prepared as described above were substituted for dimethyl phthalate in the above composition. These films had excellent flexibility and clarity.

Samples of all of the films were placed in an air circulating oven for 24 hours at 100° C. In another instance, samples were immersed in water at room temperature for 48 hours, removed, rinsed with distilled water, and dried for 2 hours at 60° C. The superiority of films containing the plasticizers of this invention over similar films containing dimethylphthalate in resistance to loss of weight under this treatment is shown in Table II.

Table II

| Plasticizer | Percent weight loss of film after 24 hrs. at 100° C. | Percent weight loss of film after 48 hours in water at room temperature |
|---|---|---|
| Dimethyl phthalate | 5.0 | 9.6 |
| Acylated polyester of Example I | 2.0 | 2.6 |
| Acylated polyester of 1,4-butanediol and 1,2-propylene glycol with a mixture of adipic and phthalic acids of Example II | 1.9 | 2.4 |
| Acylated polyester of Example IV | 1.6 | 2.2 |
| Acylated polyester of 1,6-hexanediol and 1,2-propylene glycol with adipic acid of Example VI | 1.5 | 1.9 |
| Acylated polyester of 1,4-butanediol, and 1,2-propylene glycol with a mixture of adipic and phthalic acids of Example VII | 1.7 | 2.2 |

EXAMPLE X

A mixture consisting of 63.5 percent by weight of a copolymer of 95 percent vinyl chloride and 5 percent vinyl acetate having a molecular weight of about 24,000 as determined by the Staudinger method and 35 percent by weight of the acylated polyester of Example I, 1.3 percent by weight of barium ricinoleate, and 0.6 percent by weight of cadmium 2-ethyl-hexoate was first prepared. The components of the mixture were dry blended and charged onto a steam-heated two-roll (rubber) mill whose temperature is maintained at about 150° C., where they are fused together to form a coherent mass.

A 0.04 inch thick sheet was taken from the mill and found to possess good stability to heat in a circulating air oven at 121° C. for 41 hours. The sheet has very good flexibility and low extractability in both oil and water.

This application is a continuation-in-part of our application, Serial No. 256,818 filed on November 16, 1951, now abandoned.

We claim:

1. As a novel compound, a liquid acylated polyester having an average molecular weight of 600 to 3,000 and the following general formula:

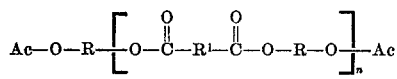

wherein Ac represent monobasic acyl radicals containing from 2 to 18 carbon atoms and wherein at least one of the acyl radicals contains from 10 to 18 carbon atoms, R represents a mixture of alkylene radicals selected from the group consisting of 1,2-propylene, and one of the group consisting of 1,4-butylene and 1,6-hexylene radicals, said 1,2-propylene radical being present in the amount of 40 to 60 mole percent of the total radicals, $R^1$ represents a radical selected from the group consisting of an alkylene radical of 3 to 8 carbon atoms and 1,2-arylene radical, said 1,2-arylene radical being present in an amount not exceeding 50 mole percent of the total $R^1$ radicals, the ratio of R to $R^1$ radicals being 1.1:1 to 1.5:1, and $n$ represents an integer from 2 to 10.

2. As a novel compound, a liquid acylated polyester according to claim 1 wherein both Ac's are lauroyl, R represents a mixture of 50 mole percent of 1,2-propylene and 50 mole percent of 1,4-butylene radicals, and $R^1$ represents a 1,4-butylene radical, the ratio of R to $R^1$ radicals being substantially equivalent to 1.2:1.

3. As a novel compound, a liquid acylated polyester according to claim 1 wherein one of the Ac's represents lauroyl and the other Ac represents oleyl, R represents a mixture of 50 mole percent of 1,2-propylene and 50 mole percent of 1,4-butylene, $R^1$ represents a mixture of 50 mole percent of 1,4-butylene and 50 mole percent of 1,2-phenylene, the ratio of R to $R^1$ being substantially equivalent to 1.2:1.

4. As a new compound, a liquid acylated polyester according to claim 1 wherein both Ac's are 2-ethylhexoyl, R represents a mixture of 50 mole percent 1,2-propylene and 50 mole percent 1,6-hexylene radicals and $R^1$ represents a 1,4-butylene radical, the ratio of R to $R^1$ radicals being substantially equivalent to 1.1 to 1.0.

5. As a new compound, a liquid acylated polyester according to claim 1 wherein both Ac's are capryl, R represents a mixture of 50 mole percent, 1,2-propylene and 50 mole percent 1,4-butylene radicals and $R^1$ represents a 1,4-butylene radical, the ratio of R to $R^1$ radicals being substantially equivalent to 1.2 to 1.0.

6. As a new compound, a liquid acylated polyester according to claim 1 wherein one of the Ac's represents lauroyl and the other Ac represents benzoyl, R represents a mixture of 50 mole percent of 1,2-propylene and 50 mole percent of 1,4-butylene, and $R^1$ represents a 1,4-butylene radical, the ratio of R to $R^1$ radicals being substantially equivalent to 1.2 to 1.0.

7. A process for preparing the product of claim 1 comprising heating a mixture of 1,2-propylene glycol and a glycol selected from the class of 1,4-butanediol and 1,6-hexanediol, wherein said mixture contains 40 to 60 mole percent of 1,2-propylene glycol, with a dicarboxylic acid selected from the class of aliphatic dicarboxylic acids of 5 to 10 carbon atoms and dicyclic dicarboxylic acids and anhydrides of 8 carbon atoms to form a polyester, reacting the polyester with an acylating agent selected from the class of monocarboxylic acids and anhydrides of 2 to 18 carbon atoms, wherein said acylating agent contains at least 50 mole percent of an acylating agent containing 10 to 18 carbon atoms to form an acylated polyester, heating the said acylated polyester under reduced pressure above 200° C. to remove low boiling components.

References Cited in the file of this patent

UNITED STATES PATENTS

| | | |
|---|---|---|
| 2,106,703 | Cox et al. | Feb. 1, 1938 |
| 2,499,983 | Beavers | Mar. 7, 1950 |
| 2,512,722 | Lanham | June 27, 1950 |
| 2,575,196 | Smith | Nov. 13, 1951 |
| 2,677,700 | Jackson et al. | May 4, 1954 |